Patented July 3, 1945

2,379,678

UNITED STATES PATENT OFFICE 2,379,678

PROCESS FOR DISPERSING PIGMENTS

Rodney Garrett Brown, Freehold, and Richard Russell Roberts, Parlin, N. J., assignors to E. I. du Pont de Nemours & Company, Wilmington, Del., a corporation of Delaware No Drawing. Application July 9, 1942, Serial No. 450,336

5 Claims. (Cl. 106—193)

This invention relates to a treatment of colloidal coloring matter suspended in an aqueous medium and more particularly to the recovery of organic pigment dyestuffs such as certain maroon and like pigments during their dispersion in an organic vehicle by direct transfer from an aqueous suspension of such materials.

Numerous processes are known and have been employed for the dispersion of pigments in organic vehicles. A commonly used method is the so-called "flushing" process in which pigments suspended in water (an intermediate stage in the manufacture of chemically precipitated pigments) are transferred direct, by proper treatment, from the water suspension to an organic vehicle which forms at least part of the final coating composition. A process of this type which is particularly useful on a commercial scale is described in U. S. Patent 2,140,745. For most pigments, the separated water after transfer of the pigment to the organic vehicle by the process of the patent is free of all coloring matter. However, in some cases, notably certain maroon, red and iron blue pigment aqueous slurries, a small proportion of the pigment is present in a colloidal state. When the pigments are transferred to the organic vehicle from a water suspension by the methods suggested above, the very finely divided particles are not so transferred but remain in the water phase which is discarded. Some of the pigments, a small part of which exist in a state of fine subdivision and which is lost in the discarded separated water, are quite expensive and this loss represents appreciable money value, particularly since compositions containing these colors are manufactured in large volume. Also, the reduction in pigment content in the final enamel by this loss causes a corresponding reduction in hiding power. By the process of the present invention, however, the finely divided portion of the pigment is also transferred from the water slurry, thereby greatly improving the economics of this method for dispersing pigments.

This invention has as a primary object the provision of a means for preventing loss of finely divided pigment particles during the dispersion of pigments by "flushing" methods and modifications thereof.

Another object is the provision of a process for dispersing pigments containing finely divided particles as a part thereof, by direct transfer from an aqueous slurry of such pigments to an organic vehicle whereby the hiding power of the final coating composition is improved and more accurately controlled.

A further object is the provision of a process for dispersing pigments containing a portion of extremely finely divided particles by a modified "flushing" process which does not deleteriously affect the color and durability of finishes prepared from the ultimate coating composition.

A still further object is the provision of a means for preventing loss of finely divided pigment particles during dispersion of pigments by "flushing" methods which does not adversely affect the stability or corrosive properties of the ultimate composition during extended storage periods. Other objects will appear as the description of the invention proceeds.

These objects are accomplished by the addition of phosphoric acid or mono-alkali metal phosphate, preferably phosphoric acid, to a mixture of an aqueous slurry of a pigment containing a portion of extremely finely divided particles and a substantially water immiscible organic vehicle, preferably immediately after the major portion of the pigment has been transferred by a suitable "flushing" treatment to the organic vehicle and "flushing" treatment then continued until the finely divided pigment particles are likewise taken up by the organic vehicle, leaving the original aqueous medium substantially free of pigment color.

In the general practice of the invention, the pigment pulp consisting of pigment suspended in water is preferably first mechanically mixed with an organic vehicle such as a vegetable oil or a vehicle containing nitrocellulose and a water immiscible liquid which is a solvent for the nitrocellulose. This mixing can be accomplished conveniently with a kneading machine such as a Werner and Pfleiderer mixer. After a short mixing period, the pigment is taken up by the organic vehicle. However, in some instances the residual water which is normally discarded remains colored with the very fine pigment particles and this material is lost with the discarded water. In the present invention, this portion of the pigment is recovered by adding a small amount of orthophosphoric acid to the charge in the mixer after the transfer of the major portion of the pigment to the organic vehicle. During the short additional mixing cycle which follows the introduction of the agent, the finely divided particles are also taken up by the organic vehicle leaving the water phase devoid of pigment color. The water is then decanted and otherwise removed according to known methods. The pigmented organic vehicle is then employed in the manufacture of coating compositions by methods well known in the art.

The following examples are given by way of illustration only and no limitations are intended thereby except as indicated in the appended claims:

Example I

| | Per cent by weight |
|---|---|
| Cellulose nitrate [1] (dry weight) | 47.1 |
| Maroon toner pigment [2] (dry weight) | 17.7 |
| Blown castor oil | 10.6 |
| Dibutyl phthalate | 11.4 |
| Phosphoric acid (85% U. S. P.) | 0.5 |
| Maroon toner pigment [2] (dry) | 7.6 |
| Dibutyl phthalate | 5.0 |
| Phosphoric acid (85% U. S. P.) | 0.1 |
| | 100.0 |

[1] The viscosity characteristic of the cellulose nitrate used in this example was about 8 seconds as determined according to the procedure outlined in A. S. T. M. specifications D-301-33, formula C. The cellulose nitrate was wet with water in the proportion of 78.3 parts by weight of cellulose nitrate to 21.7 parts by weight of water.

[2] The maroon toner pigment was used in the form of a pigment pulp which consisted of 26.4 parts by weight of pigment and 73.6 parts by weight of water. The maroon pigment was the reaction product of meta-nitranilid of 2,3 hydroxynaphthoic acid and diazo-meta-nitro-para-toluidine described specifically in Example 1 of U. S. Patent 1,803,657.

This composition which represents an intermediate product in the manufacture of enamels was prepared in accordance with the procedure described in U. S. Patent 2,140,745. The water-wet cellulose nitrate as obtained in the manufacture of commercial cellulose nitrate in the stage prior to the conventional dehydration with alcohol and while still uncolloided was mixed in a Werner & Pfleiderer mixer with the maroon pigment pulp representing an intermediate stage in the manufacture of chemically precipitated pigments for 20 minutes. Blown castor oil was added and mixing continued for about ½ hour to provide a uniform mixture of these ingredients. Dibutyl phthalate in the amount shown was added and the charge was kneaded until complete separation of water occurred and the pigment was taken up by the cellulose nitrate which was simultaneously colloided by the dibutyl phthalate. The separated water, however, was quite red in color and this color was not extracted from the water even after extended mixing.

Phosphoric acid in the proportion indicated was added and mixing continued for about 5 minutes or until all of the red color in the separated water had been absorbed by the plastic mass. The separated water was then decanted from the mixer and discarded. Additional pigment pulp and dibutyl phthalate were added to the charge with further mixing until separation of the water took place. A small amount of phosphoric acid as shown was incorporated with continued mixing for about 5 minutes until the red color in the separated water was absorbed by the mass. The free separated water was decanted and discarded and the residual water then removed from the pigmented plastic mass by means of reduced pressures and with the aid of a "water carrier" as described in U. S. Patent 2,140,745.

It has been determined that until the present discovery was employed in the manufacture of the above described intermediate up to about 2.8% of this very expensive pigment was lost in the discarded separated water. All of this formerly lost pigment may now be recovered by the simple and entirely practical procedure of the present invention.

Practically all of the phosphoric acid remains in the separated water and is not absorbed by the pigmented intermediate. It is estimated that not over about .04% of phosphoric acid is present in the final enamel of which the following is typical of compositions that may be prepared from the above described intermediate.

Example II

| | Per cent by weight |
|---|---|
| Intermediate of Example I | 22.1 |
| Butyl acetate | 27.6 |
| High solvency petroleum naphtha (95–135° C.) | 2.0 |
| Petroleum naphtha (88–131° C.) | 5.7 |
| Methyl ethyl ketone | 7.6 |
| Butyl alcohol | 8.9 |
| Ethyl alcohol | 13.8 |
| Butyl acetate | 1.8 |
| Blown castor oil | 0.6 |
| Cellulose nitrate (low viscosity) | 1.4 |
| Synthetic resin solution [1] | 8.5 |
| | 100.0 |

[1] The synthetic resin solution used in this composition consisted of 70 parts by weight of the reaction product of

| | Per cent by weight |
|---|---|
| Coconut oil | 50.6 |
| Glycerine | 16.8 |
| Phthalic anhydride | 32.6 |
| | 100.0 | dissolved in 30 parts by weight of a solvent vehicle consisting of 60 parts by weight of butyl acetate and 40 parts by weight of high solvency petroleum naphtha (95–135° C.). The resin was prepared in accordance with conventional methods well known in the art.

The enamel was prepared by charging the ingredients into a conventional paddle mixer and mixing until a uniform product was obtained. The operation is preferably carried out in two stages as indicated in the example for greater efficiency although if desired all of the ingredients may be charged into the mixer at one time.

Finishes prepared from the enamel were identical in color to those prepared from compositions manufactured by a similar method but omitting the phosphoric acid treatment. Hiding power was improved because the finely divided pigment particles are retained rather than lost with the discarded separated waters. Outdoor durability of the enamel was at least equal to that of enamels prepared by the unmodified process. Corrosion and color stability of the enamel during storage was improved by the presence of the very small amount of phosphoric acid which was retained in the pigmented intermediate.

It has been found that of all the inorganic acids, salts, and bases tested, only phosphoric acid is entirely suitable for recovering the colloidal pigment particles. Primary sodium phosphate (NaH$_2$PO$_4$) may also be used satisfactorily, but requires much more time. Carboxylic acids, esters and alcohols are ineffective, and therefore like the other inorganic acids, salts, and bases are not the equivalent of phosphoric acid or monosodium phosphate in the present method.

The amount of phosphoric acid required to obtain the desired results varies considerably depending upon the type of pigment treated, the state or degree of subdivision, the amount of finely divided pigment and the pH of the water which constitutes the liquid vehicle in the original pigment slurry. If the pH of the water is relatively high, i. e., alkaline, greater amounts of the agent are required for recovery of the colloidal portion of the pigment, and conversely, if the pH of the water is low, i. e. acid, lesser amounts of the phosphoric acid are satisfactory. However, for most pigments the amount of phosphoric acid employed should be within the limits of between about ½ to 2 times the amount of colloidal pigment. The preferred practice is the use of about equal parts of phosphoric acid and colloidal pigment if the pH of the water vehicle is about 7.

Although the phosphoric acid is preferably added at that stage in the pigment dispersion process when the major portion of the pigment has been transferred to the organic vehicle and the water has separated, it may be added with the aqueous pigment slurry or at other convenient points in the operating cycle.

The treatment is not only applicable to cellulose nitrate vehicles but may be employed also with other organic vehicles including those containing essentially synthetic resins, particularly alkyd resins, and oleoresinous vehicles where simple "flushing" methods of transferring pigments from a water suspension are sometimes used.

While the action of the phosphoric acid is not fully understood and we do not wish to be bound by any explanation at present, it appears that the acid places the finely divided pigment particles in such condition that they are more readily taken up by the plastic mass since without the treatment, mixing or kneading may be continued indefinitely without removing the very fine particles from the separated water.

The process of the invention is particularly useful for recovering organic pigment dyestuffs such as maroon and para and toluidine toners during "flushing" methods of dispersing pigments since these pigments frequently contain extremely finely divided pigment particles of colloidal character which have been lost prior to the present discovery. However, the treatment may also be employed with other pigments such as iron blue pigments which contain particles of colloidal nature in a water vehicle when dispersed by "flushing" methods.

The process of the present invention has several important advantages, the primary being the very substantial savings which may be effected by the simple inexpensive expedient described above. The color and durability of enamels manufactured in accordance with the process of the invention are not adversely affected. Color stability and corrosion tendencies of enamels during extended storage prepared by the new practice are improved. Hiding power is improved and more accurately controlled in the final enamel in the practice of the present invention.

It is apparent that many widely different embodiments of this invention may be made without departing from the spirit and scope thereof, and therefore, it is not intended to be limited except as indicated in the appended claims.

We claim:

1. In the process of dispersing an organic pigment dye in an organic vehicle by direct transfer of the pigment dye from a water slurry to an organic vehicle having a pH of about 7, the step of recovering colloidal pigment particles retained in the water slurry by adding about an equal amount to the said colloidal pigment of material from the class consisting of phosphoric acid and a mono-alkali metal phosphate to a mixture of a substantially water-immiscible organic vehicle and a pigment water slurry containing colloidal pigment particles and mixing until the separated water is substantially free of all pigment particles.

2. Process of claim 1 in which the organic vehicle contains cellulose nitrate.

3. Process of claim 1 in which the pigment is an aryl amide of 2,3 hydroxy-naphthoic acid combined with a compound selected from the group consisting of diazo compounds of the benzene and naphthalene series.

4. Process of claim 1 in which the pigment is the reaction product of meta-nitranilid of 2,3 hydroxy-naphthoic acid and diazo-meta-nitropara toluidine.

5. Process for dispersing organic pigment dye in an organic vehicle which comprises suspending the organic pigment dye in an aqueous medium, adding a water-immiscible organic vehicle having a pH of about 7 to said medium containing suspended pigment particles, some of which are of colloidal particle size, mixing until the major portion of the pigment has been absorbed by the organic vehicle and the water has separated and the remaining pigment is substantially all in colloidal form, adding phosphoric acid in amount about equal to the colloidal pigment, continuing mixing until the colloidal particle size portion of the pigment has been absorbed by the organic vehicle and removing the pigment free water.

RODNEY GARRETT BROWN.
RICHARD RUSSELL ROBERTS.